L. J. LABOUNTY.
LOOM-PICKER FASTENING.
No. 171,520.  Patented Dec. 28, 1875.
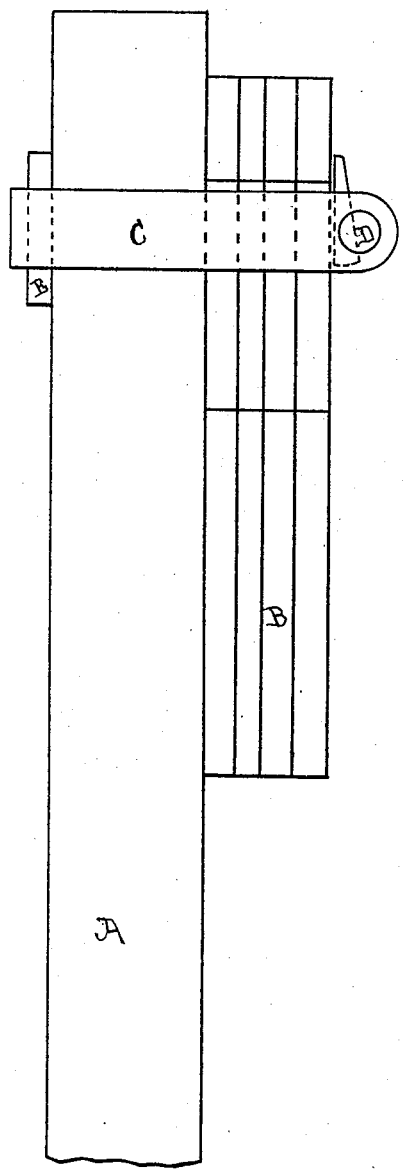
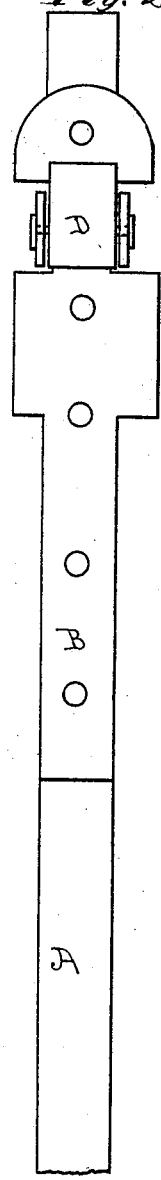

UNITED STATES PATENT OFFICE.

LEONARD J. LABOUNTY, OF LOWELL, MASSACHUSETTS, ASSIGNOR TO WILLIAM E. WHITEHEAD AND ABEL T. ATHERTON, OF SAME PLACE.

IMPROVEMENT IN LOOM-PICKER FASTENINGS.

Specification forming part of Letters Patent No. 171,520, dated December 28, 1875; application filed September 24, 1875.

*To all whom it may concern:*

Be it known that I, LEONARD J. LABOUNTY, of Lowell, in the county of Middlesex and Commonwealth of Massachusetts, have invented certain Improvements in Loom-Picker Fastenings, of which the following is a specification:

My invention relates to an improved device for holding the loom-picker to the staff; and consists of a strap or band, and a cam or eccentric, in combination with the picker and staff, with or without a flexible packing.

The accompanying drawing represents my invention.

Figure 1 is a side view, and Fig. 2 a front view, of the picker and upper end of the picker-staff.

A is the picker-staff. B is the picker. C is the strap which confines, in combination with the cam or eccentric D, the picker to the staff. E is a flexible elastic or other suitable packing, which is of advantage to use in some cases, while in others its use is unnecessary.

To remove the picker from the staff, the part of the eccentric nearest the round end of the picker is raised from the picker, which removes the compression from the same, and liberates it from the picker-staff, by which means the picker can be removed, and the same or another be substituted in its place.

The advantages of this method of fastening the picker to the staff are these: It is impossible for the picker to move on the staff when once fastened by this device; consequently, the shuttle is always compelled to strike the picker in the same place, which prevents the shuttle from being thrown from the loom, as is the case when the picker is not securely held in its place on the staff, for the impression first made upon the picker by the point of the shuttle is the guide by which the shuttle is operated in the right course on the loom-lathe across from one side to the other, so that after an impression is once made in the picker, and the picker then moves on the staff, the point of the shuttle will glance into this impression and be thrown out of its true course, and out of the loom, frequently doing great damage to the warp in the loom.

Another advantage is, that where the point of the shuttle continually strikes the picker in one place, the material of which the picker is made becomes compressed and hardened at this place, and, consequently, there is greater durability to the picker than where the picker is constantly shifting upon the staff, as is the case where other fastenings are used.

Another advantage is, that the staff is not weakened by means of making holes in the same for the reception of the screws or rivets by means of which the picker is confined to the staff.

This latter method of confining the picker to the staff is the one commonly in use, and is objectionable on account of its want of durability, as the holes in the staff, soon after the picker is in use, become so greatly enlarged, owing to the picker moving upon the staff, as to utterly prevent the screws from confining the picker in any one place upon the staff.

It is advantageous to use the rubber or other packing in case the picker-staff should not be made of thoroughly-seasoned wood, as in this case the rubber "takes up" whatever space may exist between the strap and the staff, thereby always allowing the strap to maintain a uniform tension in the picker.

I am aware that surrounding bands and tightening-wedges have been used to secure pickers to their staffs; but wedges are liable to work loose, and require to be screwed to the staffs, thus weakening the latter, and they are inconvenient in use, and liable to be separated from the bands and lost.

I claim as my invention—

1. The combination of the strap C and eccentric D with the staff A and picker B, as and for the purpose herein specified.

2. The combination of the elastic packing E with the staff A, picker B, strap C, and eccentric D, substantially as and for the purpose herein specified.

L. J. LABOUNTY.

Witnesses:
ABEL T. ATHERTON,
M. W. CONLAN.